United States Patent
Yanai et al.

(10) Patent No.: US 11,286,371 B2
(45) Date of Patent: Mar. 29, 2022

(54) THERMOPLASTIC RESIN COMPOSITION, SHAPED ARTICLE, AND VEHICLE COMPONENT

(71) Applicant: Mitsubishi Chemical Corporation, Chiyoda-ku (JP)

(72) Inventors: Toshimi Yanai, Tokyo (JP); Yoshifumi Shikisai, Tokyo (JP); Kouichi Kanemori, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/729,580

(22) Filed: Dec. 30, 2019

(65) Prior Publication Data

US 2020/0131338 A1    Apr. 30, 2020

Related U.S. Application Data

(63) Continuation of application No. PCT/JP2018/025962, filed on Jul. 10, 2018.

(30) Foreign Application Priority Data

Jul. 14, 2017  (JP) .............................. JP2017-13 8114
May 31, 2018  (JP) .............................. JP2018-104326

(51) Int. Cl.
| | |
|---|---|
| C08L 33/12 | (2006.01) |
| C08F 220/14 | (2006.01) |
| C08F 220/38 | (2006.01) |
| C08K 5/527 | (2006.01) |

(52) U.S. Cl.
CPC ............ C08K 5/527 (2013.01); C08F 220/14 (2013.01); C08F 220/382 (2020.02)

(58) Field of Classification Search
CPC ......... C08F 220/14; C08L 33/12; C08K 5/527
See application file for complete search history.

(56) References Cited

U.S. PATENT DOCUMENTS

| | | | |
|---|---|---|---|
| 6,770,693 B2 * | 8/2004 | Stein .................... | C08K 5/1345 252/400.24 |
| 2018/0258272 A1 * | 9/2018 | Matsumoto ............... | C08F 2/38 |

FOREIGN PATENT DOCUMENTS

| | | | | |
|---|---|---|---|---|
| DE | 733671 A1 | * | 9/1996 | ............. C08K 5/526 |
| JP | 60-120735 A | | 6/1985 | |
| JP | B-S6241973 | | 9/1987 | |
| JP | 62-288655 A | | 12/1987 | |
| JP | 2003-105158 A | | 4/2003 | |
| JP | 2004-224813 A | | 8/2004 | |
| JP | 2009-256406 A | | 11/2009 | |
| JP | 2013-231135 A | | 11/2013 | |
| JP | A-2014-098113 | | 5/2014 | |
| JP | 2014-149395 A | | 8/2014 | |
| JP | 2016-035077 A | | 3/2016 | |
| WO | WO 2014/018301 A1 | | 1/2014 | |
| WO | WO 2017/022393 A1 | | 2/2017 | |

OTHER PUBLICATIONS

Computer-generated English-language translation of EP-733671-A1. (Year: 1996).*
SciFinder search. (Year: 2021).*
Indian Office Action dated Sep. 7, 2020 in Indian Patent Application No. 202047000651 (with English translation), 5 pages.
International Search report dated Oct. 2, 2018 in PCT/JP2018/025962 filed on Jul. 10, 2018 (with English Translation), 3 pages.
Extended European Search Report dated Jun. 18, 2020 in Patent Application No. 18831147.6, 7 pages.
Japanese Office Action dated Jan. 5, 2021 in Japanese Patent Application No. 2019-529723 (with unedited computer generated English translation), 17 pages.
Indian Hearing Notice issued Mar. 30, 2021 in Indian Patent Application No. 202047000651, 2 pages.
Office Action dated May 19, 2021, in corresponding Chinese Patent Application No. 201880046414.4, (with Machine translation obtained by Global Dossier).
Hearing Notice mailed on Aug. 30, 2021, in corresponding Indian Application No. 202047000651.
Office Action dated Sep. 10, 2021, in corresponding Chinese Application No. 201880046414.4 (with English translation).

* cited by examiner

*Primary Examiner* — Vu A Nguyen
(74) *Attorney, Agent, or Firm* — Oblon, McClelland, Maier & Neustadt, L.L.P.

(57) ABSTRACT

Provided is a thermoplastic resin composition excellent in heat resistance, transparency, appearance after shaping, and weather resistance, and in which coloring is suppressed during shaping processing. The thermoplastic resin composition of the present invention includes a copolymer (P1), and an antioxidant (O) represented by General Formula (1), in which the thermoplastic resin composition contains 80% by mass or more of the copolymer (P1) with respect to a total mass of the thermoplastic resin composition, and the copolymer (P1) includes 80 mol % or more of a repeating unit (A) derived from methyl (meth)acrylate (a), 2 mol % or more and 7 mol % or less of a repeating unit (B) derived from (meth)acrylic acid (b), and 0.001 mol % or more and 0.15 mol % or less of a repeating unit (C) having a glutaric anhydride structure.

(1)

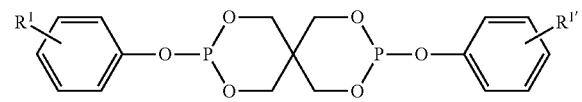

[in Formula (1), $R^1$ and $R^{1'}$ each independently represent one or a plurality of alkyl groups having 1 to 8 carbon atoms substituted at an arbitrary position on a phenyl group]

13 Claims, No Drawings

THERMOPLASTIC RESIN COMPOSITION, SHAPED ARTICLE, AND VEHICLE COMPONENT

This application is a continuation application of International Application No. PCT/JP2018/025962, filed on Jul. 10, 2018, which claims the benefit of priority of the prior Japanese Patent Application No. 2017-138114 filed in Japan on Jul. 14, 2017 and Japanese Patent Application No. 2018-104326 filed in Japan on May 31, 2018, the contents of which are hereby incorporated by reference.

TECHNICAL FIELD

The present invention relates to a thermoplastic resin composition excellent in heat resistance, transparency, appearance after shaping, and weather resistance, and in which coloring is suppressed during shaping processing, a shaped article including the thermoplastic resin composition, and a vehicle component including the shaped article.

BACKGROUND ART (Meth)acrylic resins are widely used in various fields such as optical materials, vehicle components such as automobiles, lighting materials, and building materials for the excellent transparency and dimensional stability thereof.

In recent years, there has been a demand for a material suitable for use in lamp covers and vehicle components, which not only has excellent transparency and dimensional stability, but also has optical properties as a vehicle component (PTL 1).

In recent years, there has been a demand for shaped articles of (meth)acrylic resins to have improved performances as components become thinner and finer. In particular, for vehicle components such as tail lamp covers and head lamp covers, there are demands for (meth)acrylic resins having excellent heat resistance, such as increased heat generation due to larger lamps and increased illuminance, a demand for thinner lamp covers and the like to accompanied with cost reduction, and a demand to be capable of carrying out installation at a position where the temperature rises to extremes under direct sunlight.

Furthermore, in an increasing number of cases, vehicle components are being installed at positions easily exposed to direct sunlight and there is a demand for (meth)acrylic resins having excellent weather resistance.

In addition, in terms of design, there is a demand for vehicle components to be transparent and have a low presence. That is, there is a demand for a (meth)acrylic resin which is excellent in transparency and in which coloring during shaping processing is suppressed.

Since the melt shaping of (meth)acrylic resins using a large extruder with a long retention time is becoming more common and (meth)acrylic resins with improved heat resistance need to undergo shaping processing at a higher temperature than in the related art, there is a demand for the appearance after the shaping to not be impaired due to thermal decomposition of the (meth)acrylic resin. That is, there is a demand for a (meth)acrylic resin which has an excellent appearance after shaping.

As a method for improving the heat resistance of a (meth)acrylic resin, for example, PTL 1 and PTL 2 propose a copolymer having a methyl methacrylate unit, a methacrylic acid unit, and a glutaric anhydride unit.

PTL 3 proposes a thermoplastic resin composition having a heat-resistant acrylic copolymer, a phosphite compound, and a hindered phenolic compound.

PTL 4 proposes a thermoplastic resin composition having a heat-resistant acrylic copolymer and a white pigment.

CITATION LIST

Patent Literature

[PTL 1] Japanese Unexamined Patent Application, First Publication No. 2009-256406
[PTL 2] PCT International Publication No. 2017/022393
[PTL 3] Japanese Unexamined Patent Application, First Publication No. S60-120735
[PTL 4] PCT International Publication No. 2014/018301

DISCLOSURE OF INVENTION

Technical Problem

However, the copolymer proposed in PTL 1 has a high glutaric anhydride unit content, has insufficient weather resistance, and is also colored yellow, with poor transparency. In addition, there is a case that the appearance after shaping is impaired due to thermal decomposition of the copolymer.

The copolymer proposed in PTL 2 suppresses yellowing by reducing the content of glutaric anhydride units, but the effect thereof is not sufficient. In addition, the weather resistance was insufficient.

The thermoplastic resin composition proposed in PTL 3 suppresses yellowing using a stabilizer, has a large glutaric anhydride unit content, has insufficient weather resistance, and is further colored yellow with poor transparency. In addition, there is a case that the appearance after shaping is impaired due to thermal decomposition of the copolymer.

The thermoplastic resin composition proposed in PTL 4 has improved yellowing due to a white pigment, but uses thereof are limited to non-transparent applications such as a reflector because of the white color. That is, the resin does not have transparency.

The present invention has an object of solving these problems.

That is, the object of the present invention is to provide a thermoplastic resin composition excellent in heat resistance, transparency, appearance after shaping, and weather resistance, and in which coloring is suppressed during shaping processing, a shaped article including the thermoplastic resin composition, and a vehicle component including the shaped article.

Solution to Problem

As a result of a number of studies to solve the above problems, the present inventors completed the present invention.

The present invention has the following aspects.

[1] A thermoplastic resin composition including a copolymer (P1), and an antioxidant (O) represented by General Formula (1),
in which the thermoplastic resin composition contains 80% by mass or more of the copolymer (P1) with respect to a total mass of the thermoplastic resin composition, and
the copolymer (P1) includes 80 mol % or more of a repeating unit (A) derived from methyl (meth)acrylate (a), 2 mol % or more and 7 mol % or less of a repeating unit (B)

derived from (meth)acrylic acid (b), and 0.001 mol % or more and 0.15 mol % or less of a repeating unit (C) having a glutaric anhydride structure.

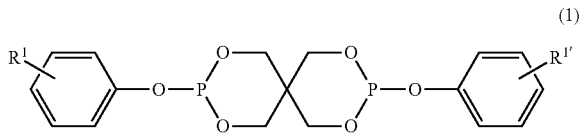
(1)

[in Formula (1), $R^1$ and $R^{1\prime}$ each independently represent one or a plurality of alkyl groups having 1 to 8 carbon atoms substituted at an arbitrary position on a phenyl group]

[2] The thermoplastic resin composition according to [1], in which the antioxidant (O) is represented by General Formula (2).

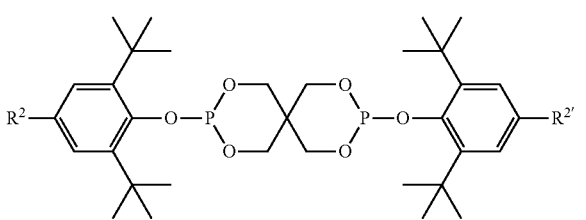
(2)

[in Formula (2), $R^2$ and $R^{2\prime}$ each independently represent an alkyl group having 1 to 8 carbon atoms]

[3] The thermoplastic resin composition according to [1] or [2], in which the thermoplastic resin composition contains 0.01% by mass or more and 0.18% by mass or less of the antioxidant (O) with respect to the total mass of the thermoplastic resin composition.

[4] The thermoplastic resin composition according to any one of [1] to [3], in which the thermoplastic resin composition contains 0.001% by mass or more and 0.4% by mass or less of a phenolic compound represented by General Formula (3) with respect to the total mass of the thermoplastic resin composition.

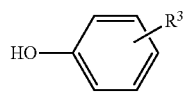
(3)

[in Formula (3), $R^3$ represents one or a plurality of alkyl groups having 1 to 8 carbon atoms substituted at an arbitrary position on a phenyl group]

[5] The thermoplastic resin composition according to [4], in which the antioxidant (O) is a compound represented by General Formula (2) and the phenolic compound is a compound represented by General Formula (4).

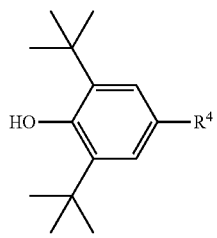
(4)

[in Formula (4), $R^4$ represents an alkyl group having 1 to 8 carbon atoms]

[6] The thermoplastic resin composition according to any one of [1] to [5], in which the thermoplastic resin composition contains 0.02% by mass or more and 0.14% by mass or less of the antioxidant (O) with respect to the total mass of the thermoplastic resin composition, and the copolymer (P1) includes 80 mol % or more of a repeating unit (A) derived from methyl (meth)acrylate (a), 2 mol % or more and 7 mol % or less of a repeating unit (B) derived from (meth)acrylic acid (b), and 0.005 mol % or more and 0.02 mol % or less of a repeating unit (C) having a glutaric anhydride structure.

[7] The thermoplastic resin composition according to any one of [1] to [5], in which the thermoplastic resin composition contains 0.03% by mass or more and 0.13% by mass or less of the antioxidant (O) with respect to the total mass of the thermoplastic resin composition, and the copolymer (P1) includes 80 mol % or more of a repeating unit (A) derived from methyl (meth)acrylate (a), 2 mol % or more and 4 mol % or less of a repeating unit (B) derived from (meth)acrylic acid (b), and 0.0075 mol % or more and 0.015 mol % or less of a repeating unit (C) having a glutaric anhydride structure.

[8] The thermoplastic resin composition according to any one of [1] to [7], in which a total content of unreacted methyl (meth)acrylate (a) and unreacted (meth)acrylic acid (b) contained in the thermoplastic resin composition is 0.5% by mass or less with respect to the total mass of the thermoplastic resin composition.

[9] A shaped article including the thermoplastic resin composition according to any one of [1] to [8].

[10] A shaped article including a copolymer (P2); and an antioxidant (O) represented by General Formula (5), in which the shaped article contains 80% by mass or more of the copolymer (P2) with respect to a total mass of the shaped article, and the copolymer (P2) includes 80 mol % or more of a repeating unit (A) derived from methyl (meth)acrylate (a), 2 mol % or more and 7 mol % or less of a repeating unit (B) derived from (meth)acrylic acid (b), and 0.01 mol % or more and 2 mol % or less of a repeating unit (C) having a glutaric anhydride structure.

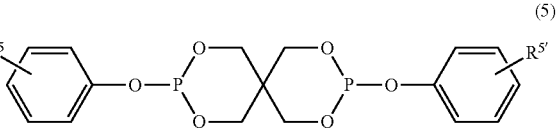
(5)

[in Formula (5), $R^5$ and $R^{5\prime}$ each independently represent one or a plurality of alkyl groups having 1 to 8 carbon atoms substituted at an arbitrary position on a phenyl group]

[11] The thermoplastic resin composition according to [10], in which the antioxidant (O) is represented by General Formula (6).

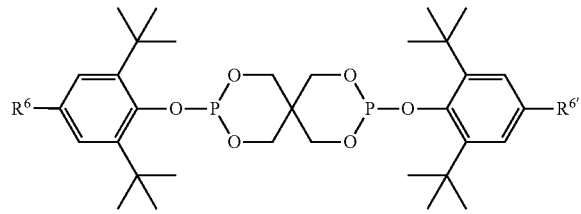

[in Formula (6), $R^6$ and $R^{6'}$ each independently represent an alkyl group having 1 to 8 carbon atoms]

[12] The shaped article according to [10] or [11], in which the shaped article contains 0.001% by mass or more and 0.12% by mass or less of the antioxidant (O) with respect to the total mass of the shaped article.

[13] The shaped article according to any one of [10] to [12], in which the shaped article contains 0.001% by mass or more and 1.0% by mass or less of a phenolic compound represented by General Formula (7) with respect to the total mass of the shaped article.

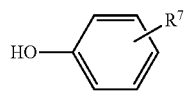

[in Formula (7), $R^7$ represents one or a plurality of alkyl groups having 1 to 8 carbon atoms substituted at an arbitrary position on a phenyl group]

[14] The shaped article according to [13], in which the phenolic compound is a compound represented by General Formula (8).

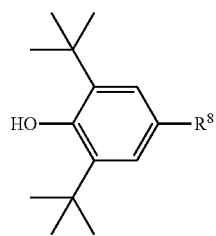

[in Formula (8), $R^8$ represents an alkyl group having 1 to 8 carbon atoms]

[15] The shaped article according to any one of [10] to [14], in which the shaped article contains 0.002% by mass or more and 0.03% by mass or less of the antioxidant (O) represented by General Formula (5) with respect to the total mass of the shaped article, and
the copolymer (P2) includes 80 mol % or more of a repeating unit (A) derived from methyl (meth)acrylate (a), 2 mol % or more and 7 mol % or less of a repeating unit (B) derived from (meth)acrylic acid (b), and 0.02 mol % or more and 1.2 mol % or less of a repeating unit (C) having a glutaric anhydride structure.

[16] The shaped article according to any one of [10] to [14], in which the shaped article contains 0.01% by mass or more and 0.025% by mass or less of the antioxidant (O) with respect to the total mass of the shaped article, and
the copolymer (P2) includes 80 mol % or more of a repeating unit (A) derived from methyl (meth)acrylate (a), 2 mol % or more and 3.5 mol % or less of a repeating unit (B) derived from (meth)acrylic acid (b), and 0.03 mol % or more and 0.6 mol % or less of a repeating unit (C) having a glutaric anhydride structure.

[17] A vehicle component including the shaped article according to any one of [9] to [16].

Advantageous Effects of Invention

The thermoplastic resin composition of the present invention is excellent in heat resistance, transparency, appearance after shaping, and weather resistance, and coloring is suppressed during shaping processing.

Since the shaped article of the present invention includes the thermoplastic resin composition of the present invention, the heat resistance, transparency, appearance, and weather resistance are excellent.

Since the vehicle component of the present invention includes the shaped article of the present invention, the heat resistance, transparency, appearance, and weather resistance are excellent.

The thermoplastic resin composition and shaped article of the present invention are suitable for use in vehicle components such as a tail lamp cover and a head lamp cover.

MODE FOR CARRYING OUT THE INVENTION

A detailed description will be given below of the present invention. In the present invention, "(meth)acrylate" and "(meth)acrylic acid" each mean at least one selected from "acrylate" and "methacrylate" and at least one selected from "acrylic acid" and "methacrylic acid".

In addition, "monomer" means an unpolymerized compound and "repeating unit" means a unit derived from the monomer formed by polymerization of the monomer. The "repeating unit" may be a unit directly formed by a polymerization reaction or a part of the unit may be converted into another structure by treating a polymer.

As will be described below, the repeating unit (C) having a glutaric anhydride structure is excluded from the repeating unit (A) derived from methyl (meth)acrylate (a) in the polymer. In addition, the repeating unit (C) having a glutaric anhydride structure is excluded from the repeating unit (B) derived from (meth)acrylic acid (b) in the polymer.

In addition, "% by mass" indicates the content of a specific component contained in the total amount of 100% by mass.

Unless otherwise specified, a numerical range expressed using "to" in the present specification means a range including the numerical values described before and after "to" as the lower limit value and the upper limit value and "A to B" means A or more and B or less.

<Thermoplastic Resin Composition>

The thermoplastic resin composition of the present invention is a resin composition including a copolymer (P1) described below and an antioxidant (O) described below.

The thermoplastic resin composition of the present invention contains 80% by mass or more of the copolymer (P1) with respect to the total mass of the thermoplastic resin composition.

When the copolymer (P1) is contained in an amount of 80% by mass or more, the shaped article obtained by shaping the thermoplastic resin composition of the present invention is excellent in transparency, heat resistance, coloring by shaping, shaped appearance, and weather resistance. The thermoplastic resin composition of the present invention more preferably includes 90% by mass or more of the copolymer (P1) with respect to the total mass of the thermoplastic resin composition.

The antioxidant (O) contained in the thermoplastic resin composition of the present invention is consumed to prevent thermal decomposition and oxidative degradation of the copolymer (P1) when producing the shaped article by heating the thermoplastic resin composition to a molten state using an extruder or an injection molding machine.

The lower limit value of the content of the antioxidant (O) in the thermoplastic resin composition of the present invention is not particularly limited, and, from the viewpoints that it is possible to suppress coloring by shaping of the shaped article obtained by shaping the thermoplastic resin composition of the present invention and that the shaped appearance is good, 0.01% by mass with respect to the total mass of the thermoplastic resin composition is preferable, 0.02% by mass is more preferable, and 0.03% by mass is even more preferable. The upper limit value of the content of the antioxidant (O) in the thermoplastic resin composition of the present invention is not particularly limited, and, from the viewpoint that it is possible to obtain a shaped article having a good appearance without generating mold stains, die stains, or the like at the time of injection molding or extrusion shaping and that the weather resistance of the shaped article is good, 0.18% by mass with respect to the total mass of the thermoplastic resin composition is preferable, 0.14% by mass is more preferable, and 0.13% by mass is even more preferable.

It is possible to arbitrarily combine the preferable upper limit value and preferable lower limit value described above to form a preferable combination of the upper limit value and the lower limit value. For example, the content of the antioxidant (O) in the thermoplastic resin composition of the present invention is preferably 0.01% by mass or more and 0.18% by mass or less with respect to the total mass of the thermoplastic resin composition, more preferably 0.02% by mass or more and 0.14% by mass or less, and even more preferably 0.03% by mass or more and 0.13% by mass or less.

<Shaped Article>

The first aspect of the shaped article of the present invention is a shaped article obtained by shaping the thermoplastic resin composition of the present invention.

The second aspect of the shaped article of the present invention is a shaped article including a copolymer (P2) described below and an antioxidant (O) described below.

The second aspect of the shaped article of the present invention contains 80% by mass or more of the copolymer (P2) with respect to the total mass of the shaped article.

If the copolymer (P2) is contained as 80% by mass or more, the shaped article is excellent in transparency, heat resistance, coloring by shaping, shaped appearance, and weather resistance. The second aspect of the shaped article of the present invention more preferably includes 90% by mass or more of the copolymer (P2) with respect to the total mass of the shaped article.

The lower limit value of the content of the antioxidant (O) in the second aspect of the shaped article of the present invention is not particularly limited, and, from the viewpoint of being capable of suppressing coloring by shaping of the shaped article and to obtain a good shaped appearance, 0.001% by mass with respect to the total mass of the shaped article is preferable, 0.002% by mass is more preferable, and 0.01% by mass is even more preferable. The upper limit value of the content of the antioxidant (O) in the second aspect of the shaped article of the present invention is not particularly limited, and, from the viewpoint of obtaining a good shaped appearance and weather resistance in the shaped article, 0.12% by mass with respect to the total mass of the shaped article is preferable, 0.03% by mass is more preferable, and 0.025% by mass is even more preferable.

It is possible to arbitrarily combine the preferable upper limit value and preferable lower limit value described above to form a preferable combination of the upper limit value and the lower limit value. For example, the content of the antioxidant (O) in the second aspect of the shaped article of the present invention is preferably 0.001% by mass or more and 0.12% by mass or less with respect to the total mass of the shaped article, more preferably 0.002% by mass or more and 0.03% by mass or less, and even more preferably 0.01% by mass or more and 0.025% by mass or less.

<Copolymer (P1)>

The copolymer (P1) is one constituent component of the thermoplastic resin composition of the present invention.

Due to the thermoplastic resin composition of the present invention including the copolymer (P1), the heat resistance of the shaped article becomes excellent.

The copolymer (P1) of the present invention includes a repeating unit (A) derived from methyl (meth)acrylate (a) (abbreviated below as "unit (A)"), a repeating unit (B) derived from (meth)acrylic acid (b) (abbreviated below as "unit (B)"), and a repeating unit (C) having a glutaric anhydride structure (abbreviated below as "unit (C)").

Details of the methyl (meth)acrylate (a) and the (meth)acrylic acid (b) will be described below.

The unit (C) in the copolymer (P1) is a structural unit represented by the chemical structural formula below. In addition, the unit (C) in the copolymer (P2) described below is also a structural unit having the same chemical structural formula.

[Chem. 9]

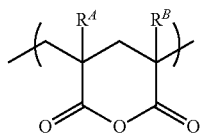

[In the formula, $R^A$ and $R^B$ each independently represent a hydrogen atom or a methyl group]

As a technique of the related art for imparting heat resistance to a (meth)acrylic resin, for example, as described in Japanese Unexamined Patent Application, First Publication No. 2017-132981, and the like, a method is known in which at least one selected from the group consisting of a structural unit derived from an N-substituted maleimide monomer, a glutarimide-based structural unit, and a lactone ring structural unit is contained therein; however, there are problems in that coloring occurs easily since a nitrogen-based compound is a raw material and in that the resin is not suitable for outdoor uses since the resin is easily hydrolyzable.

Including the unit (C) in the copolymer (P1) makes it possible for the thermoplastic resin composition of the present invention to improve heat resistance without being influenced by coloring, hydrolysis, or the like.

The lower limit value of the content ratio of the unit (A) in the copolymer (P1) is 80 mol % with respect to the total number of moles of repeating units contained in the copolymer (P1) and more preferably 90 mol % from the viewpoint of the shaped article obtained by shaping the thermoplastic resin composition of the present invention having excellent transparency and of not impairing the inherent performance of the acrylic resin having excellent workability and mechanical properties. The upper limit value of the content ratio of the unit (A) in the copolymer (P1) is 97.999 mol % and, from the viewpoint of the shaped article obtained by shaping the thermoplastic resin composition of the present invention having excellent heat resistance, 97 mol % is preferable, and 96 mol % is more preferable.

It is possible to arbitrarily combine the preferable upper limit value and preferable lower limit value described above to form a preferable combination of the upper limit value and the lower limit value. For example, the content ratio of the unit (A) in the copolymer (P1) is preferably 80 mol % or more and 97.999 mol % or less with respect to the total number of moles of repeating units contained in the copolymer (P1), more preferably 80 mol % or more and 97 mol % or less, and even more preferably 90 mol % or more and 96 mol % or less.

As described below, the repeating unit (C) having a glutaric anhydride structure is a unit formed by a cyclization reaction between a methoxycarbonyl group derived from methyl (meth)acrylate (a) and a carboxyl group derived from (meth)acrylic acid (b) adjacent to the methoxycarbonyl group in a copolymer obtained by copolymerizing the methyl (meth)acrylate (a) and the (meth)acrylic acid (b), and although derived from methyl (meth)acrylate (a) and (meth)acrylic acid (b), the unit (A) does not include the unit (C).

From the viewpoint of the shaped article obtained by shaping the thermoplastic resin composition of the present invention having excellent heat resistance and mechanical properties, the lower limit value of the content ratio of the unit (B) in the copolymer (P1) is 2 mol % with respect to the total number of moles of repeating units contained in the copolymer (P1), and 2.5 mol % is more preferable. From the viewpoint of the shaped article obtained by shaping the thermoplastic resin composition of the present invention having excellent shaped appearance, low water absorption, and moldability and of not impairing the inherent performance of the acrylic resin, the upper limit value of the content ratio of the unit (B) in the copolymer (P1) is 7 mol %, and 3.5 mol % is more preferable.

It is possible to arbitrarily combine the preferable upper limit value and preferable lower limit value described above to form a preferable combination of the upper limit value and the lower limit value. For example, the content ratio of the unit (B) in the copolymer (P1) is 2 mol % or more and 7 mol % or less with respect to the total number of moles of repeating units contained in the copolymer (P1), and preferably 2.5 mol % or more and 6 mol % or less.

As described below, the repeating unit (C) having a glutaric anhydride structure is a unit formed by a cyclization reaction between a methoxycarbonyl group derived from methyl (meth)acrylate (a) and a carboxyl group derived from (meth)acrylic acid (b) adjacent to the methoxycarbonyl group in a copolymer obtained by copolymerizing the methyl (meth)acrylate (a) and the (meth)acrylic acid (b), and although derived from methyl (meth)acrylate (a) and (meth)acrylic acid (b), the unit (B) does not include the unit (C).

From the viewpoint that the shaped article obtained by shaping the thermoplastic resin composition of the present invention is excellent in heat resistance, the lower limit value of the content ratio of the unit (C) in the copolymer (P1) is 0.001 mol % with respect to the total number of moles of repeating units contained in copolymer (P1), more preferably 0.005 mol %, and even more preferably 0.0075 mol %. From the viewpoint of the obtained shaped article having excellent coloring by shaping, shaped appearance, and weather resistance, the upper limit value of the content ratio of the unit (C) in the copolymer (P1) is 0.15 mol %, more preferably 0.02 mol %, and even more preferably 0.015 mol %.

It is possible to arbitrarily combine the preferable upper limit value and preferable lower limit value described above to form a preferable combination of the upper limit value and the lower limit value. For example, the content ratio of the unit (C) in the copolymer (P1) is 0.001 mol % or more and 0.15 mol % or less with respect to the total number of moles of the repeating units contained in the copolymer (P1), preferably 0.005 mol % or more and 0.02 mol % or less, and more preferably 0.0075 mol % or more and 0.015 mol % or less.

In the present specification, the content ratio of each unit in the copolymer is a value calculated from $^1$H-NMR measurement.

In addition, as a specific calculation method, it is possible to adopt the method described in the Examples.

In addition to the unit (A), the unit (B), and the unit (C), the copolymer (P1) may include a repeating unit derived from another monomer (d) (abbreviated below as "unit (D)").

Regarding the content ratio of the unit (D) in the copolymer (P1), the unit (D) is preferably not contained in the copolymer (P1) such that the inherent performance of the acrylic resin is not impaired in the shaped article obtained by shaping the thermoplastic resin composition of the present invention. In addition, even in a case where the unit (D) is contained in the copolymer (P1), the content ratio of the unit (D) in the copolymer (P1) is preferably more than 0 mol % and 15 mol % or less with respect to the total number of moles of the repeating unit contained in the copolymer (P1), and more preferably more than 0 mol % and 5 mol % or less.

Examples of other monomers (d) forming the unit (D) include (meth)acrylates such as ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth)acrylate, n-hexyl (meth)acrylate, cyclohexyl (meth)acrylate, n-octyl (meth)acrylate, 2-ethylhexyl (meth)acrylate, dodecyl (meth)acrylate, tridecyl (meth)acrylate, stearyl (meth)acrylate, phenyl (meth)acrylate, benzyl (meth)acrylate, phenoxyethyl (meth)acrylate, isobornyl (meth)acrylate, glycidyl (meth)acrylate, tetrahydrofurfuryl (meth)acrylate, norbornyl (meth)acrylate, adamantyl (meth)acrylate, dicyclopentenyl (meth)acrylate, dicyclopentanyl (meth)acrylate, tetracyclododecanyl (meth)acrylate and cyclohexanedimethanol mono (meth)acrylate; aromatic vinyl monomers such as styrene and α-methylstyrene.

These monomers may be used alone as one type or in a combination of two or more.

In a case where the thermoplastic resin composition of the present invention includes 0.02% by mass or more and 0.14% by mass or less of the antioxidant (O) represented by General Formula (1) with respect to the total mass of the thermoplastic resin composition, the copolymer (P1) includes the unit (A) as 80 mol % or more, the unit (B) as 2 mol % or more and 7 mol % or less, and the unit (C) as 0.005 mol % or more and 0.02 mol % or less, which is preferable from the viewpoint of the shaped article having further improved coloring by shaping, shaped appearance, and weather resistance.

In a case where the thermoplastic resin composition of the present invention includes 0.03% by mass or more and 0.13% by mass or less of the antioxidant (O) represented by General Formula (1) with respect to the total mass of the thermoplastic resin composition, the copolymer (P1) includes the unit (A) as 80 mol % or more, the unit (B) as 2 mol % or more and 4 mol % or less, and the unit (C) as 0.0075 mol % or more and 0.015 mol % or less, which is preferable from the viewpoint of the shaped article having further improved coloring by shaping, shaped appearance, and weather resistance.

<Methyl (Meth)Acrylate (a)>

The methyl (meth)acrylate (a) is a monomer which is a derivation of the unit (A) contained in the copolymer (P1) and the unit (A) contained in the copolymer (P2). In addition, a part of methyl (meth)acrylate (a) is a monomer which is a derivation of the unit (C) contained in the copolymer (P1) and the unit (C) contained in the copolymer (P2), along with a part of (meth)acrylic acid (b).

The methyl (meth)acrylate (a) means methyl methacrylate, methyl acrylate, or a mixture thereof.

Among methyl (meth)acrylates (a), from the viewpoint of the shaped article obtained by shaping the thermoplastic resin composition of the present invention having excellent transparency, the main component of methyl (meth)acrylate (a) is preferably methyl methacrylate. In addition, from the viewpoint of improving the thermal decomposition resistance of the copolymer (P1) in the thermoplastic resin composition of the present invention and the copolymer (P2) in the shaped article of the present invention, methyl acrylate is more preferably used together with methyl methacrylate.

In the present specification, the "main component" refers to a component contained as 70% by mass or more with respect to the total mass (100% by mass).

In the same manner, from the viewpoint of the obtained shaped article having excellent transparency, the main component of the unit (A) is preferably a repeating unit derived from methyl methacrylate. In addition, from the viewpoint of improving the thermal decomposition resistance of the copolymer (P1) in the thermoplastic resin composition of the present invention and the copolymer (P2) in the shaped article of the present invention, a repeating unit derived from methyl acrylate is more preferably contained together with a repeating unit derived from methyl methacrylate.

<(Meth)Acrylic Acid (b)>

(Meth)acrylic acid (b) is a monomer which is a derivation of the unit (B) contained in the copolymer (P1) of the present invention and the unit (B) contained in the copolymer (P2) of the present invention. In addition, a part of (meth)acrylic acid (b) is a monomer which is a derivation of the unit (C) contained in the copolymer (P1) and the unit (C) contained in the copolymer (P2), along with a part of the methyl (meth)acrylate (a).

(Meth)acrylic acid (b) refers to acrylic acid, methacrylic acid, or a mixture thereof.

For the (meth)acrylic acid (b), methacrylic acid is preferable since the shaped article obtained by shaping the thermoplastic resin composition of the present invention is excellent in heal resistance.

In the same manner, as the unit (B), a repeating unit derived from methacrylic acid is preferable since the obtained shaped article is excellent in heat resistance.

<Method for Producing Copolymer (P1)>

In order to obtain a copolymer (P1) including unit (A) as 80 mol % or more, unit (B) as 2 mol % or more and 7 mol % or less, and unit (C) as 0.001 mol % or more and 0.15 mol % or less, it is sufficient if a monomer composition (M) described below including methyl (meth)acrylate (a) and (meth)acrylic acid (b) at an appropriate molar ratio is polymerized to obtain a polymer composition (simply referred to below as "copolymer (P1) precursor") including a precursor of the copolymer (P1), then, using a heating means such as an injection molding machine or an extruder, the obtained copolymer (P1) precursor is subjected to a cyclization reaction between the unit (A) and the unit (B) in the precursor and the unit (C) is formed.

The heating temperature when the precursor is subjected to a cyclization reaction using a heating means such as an injection molding machine or an extruder is preferably 200° C. or more and 270° C. or less, and more preferably 210° C. or more and 260° C. or less since the productivity of the copolymer or resin composition is excellent and it is possible to suppress thermal deterioration of the copolymer. The heating time is preferably 1 second or more and 2400 seconds or less, more preferably 5 seconds or more and 1800 seconds or less, and even more preferably 10 seconds or more and 1200 seconds or less since it is possible to sufficiently mix the copolymer (P1) and to suppress thermal deterioration of the copolymer (P1).

In addition, in a case where the copolymer (P1) includes the unit (D), it is possible to obtain the copolymer (P1) including the unit (D) by producing using the monomer composition (M) including another monomer (d) in addition to methyl (meth)acrylate (a) and (meth)acrylic acid (b).

<Monomer Composition (M)>

The monomer composition (M) is a raw material for the copolymer (P1) precursor described above.

The monomer composition (M) is a monomer composition including the methyl (meth)acrylate (a) and the (meth)acrylic acid (b).

The lower limit value of the content ratio of methyl (meth)acrylate (a) in the monomer composition (M) is not particularly limited, and, from the viewpoint of the shaped article obtained by shaping the thermoplastic resin composition of the present invention having an improved appearance, low water absorption, and moldability and not impairing the inherent performances of the acrylic resin, the lower limit value is preferably 80 mol % in 100 mol % of the monomer composition (M), and 90 mol % is more preferable. The upper limit value of the content ratio of the methyl (meth)acrylate (a) in the monomer composition (M) is not particularly limited, and, from the viewpoint of the obtained shaped article having excellent heat resistance and mechanical properties, the upper limit value is preferably 99.5 mol % or less in 100 mol % of the monomer composition (M), and more preferably 99 mol % or less.

The content ratio of methyl (meth)acrylate (a) in the monomer composition (M) is more preferably 80 mol % or more and 99.5 mol % or less, and even more preferably 90 mol % or more and 99 mol % or less.

The lower limit value of the content ratio of (meth)acrylic acid (b) in the monomer composition (M) is not particularly limited, and, from the viewpoint of the shaped article obtained by shaping the thermoplastic resin composition of the present invention having excellent heat resistance and mechanical properties, the lower limit value is preferably 2.0 mol % in 100 mol % of the monomer composition (M), and more preferably 2.5 mol %. The upper limit value of the content ratio of (meth)acrylic acid (b) in the monomer composition (M) is not particularly limited, and, from the viewpoint of the obtained shaped article having an excellent appearance, low water absorption, and moldability and of not impairing the inherent performance of the acrylic resin, the upper limit value is preferably 7.0 mol % in 100 mol % of the monomer composition (M), and more preferably 6.0 mol %.

The content ratio of (meth)acrylic acid (b) in the monomer composition (M) is preferably 2.0 mol % or more and 7.0 mol % or less, and more preferably 2.5 mol % or more and 6.0 mol % or less.

The monomer composition (M) may include another monomer (d) in addition to methyl (meth)acrylate (a) and (meth)acrylic acid (b).

As the other monomer (d), it is possible to use any monomer copolymerizable with the methyl (meth)acrylate (a) and (meth)acrylic acid (b) and it is possible to use the same monomer as the "monomer forming the unit (D)" described above.

Regarding the content ratio of the other monomer (d) in the monomer composition (M), the other monomer (d) is preferably not contained in the monomer composition (M) such that the inherent performance of the acrylic resin is not impaired in the resin composition. In addition, even in a case where the monomer composition (M) includes the other monomer (d), more than 0 mol % and 15 mol % or less in 100 mol % of the monomer composition (M) is preferable, and more than 0 mol % and 5 mol % or less is more preferable.

As a method for polymerizing the monomer composition (M) to obtain the polymer composition including the copolymer (P1) precursor described above, for example, it is possible to use known polymerization methods such as bulk polymerization, solution polymerization, suspension polymerization, and emulsion polymerization. In the polymerization of the monomer composition (M), the polymerization temperature, the type of polymerization initiator, the amount of polymerization initiator, and the like may be appropriately set by persons skilled in the art based on known techniques.

<Copolymer (P2)>

The copolymer (P2) is one of the constituent components of the shaped article of the present invention.

Due to the shaped article of the present invention including the copolymer (P2), the shaped article has excellent heat resistance.

The copolymer (P2) of the present invention includes the unit (A) described above, the unit (B) described above, and the unit (C) described above.

From the viewpoint of the shaped article of the present invention having excellent transparency and of not impairing the inherent performances of the acrylic resin such as excellent processability and mechanical properties, the lower limit value of the content ratio of the unit (A) in the copolymer (P2) is 80 mol % with respect to the total number of moles of repeating units contained in the copolymer (P2), and more preferably 90 mol %. The upper limit value of the content ratio of the unit (A) in the copolymer (P1) is 97.99 mol %, and, from the viewpoint of the shaped article of the present invention having excellent heat resistance, 97 mol % is preferable and 96 mol % is more preferable.

It is possible to arbitrarily combine the preferable upper limit value and preferable lower limit value described above to form a preferable combination of the upper limit value and the lower limit value. For example, the content ratio of the unit (A) in the copolymer (P2) is preferably 80 mol % or more and 97.99 mol % or less with respect to the total number of moles of repeating units contained in the copolymer (P2), and more preferably 90 mol % or more and 97 mol % or less.

The repeating unit (C) having a glutaric anhydride structure is a unit formed by a cyclization reaction between a methoxycarbonyl group derived from methyl (meth)acrylate (a) and a carboxyl group derived from (meth)acrylic acid (b) adjacent to the methoxycarbonyl group in a copolymer obtained by copolymerizing the methyl (meth)acrylate (a) and the (meth)acrylic acid (b), and although derived from methyl (meth)acrylate (a) and (meth)acrylic acid (b), the unit (A) does not include the unit (C).

From the viewpoint of the shaped article of the present invention having excellent heat resistance and mechanical properties, the lower limit value of the content ratio of the unit (B) in the copolymer (P2) is 2 mol % with respect to the total number of moles of the repeating units contained in the copolymer (P2), and 2.5 mol % is more preferable. From the viewpoint of the shaped article of the present invention having an excellent shaped appearance, low water absorption and moldability, and not impairing the inherent performance of the acrylic resin, the upper limit value of the content ratio of the unit (B) in the copolymer (P2) is 7 mol %, and 3.5 mol % is more preferable.

It is possible to arbitrarily combine the preferable upper limit value and preferable lower limit value described above to form a preferable combination of the upper limit value and the lower limit value. For example, the content ratio of the unit (B) in the copolymer (P2) is preferably 2 mol % or more and 7 mol % or less with respect to the total number of moles of repeating units contained in the copolymer (P2), and more preferably 2 mol % or more and 3.5 mol % or less.

The repeating unit (C) having a glutaric anhydride structure is a unit formed by a cyclization reaction between a methoxycarbonyl group derived from methyl (meth)acrylate (a) and a carboxyl group derived from (meth)acrylic acid (b) adjacent to the methoxycarbonyl group in a copolymer obtained by copolymerizing the methyl (meth)acrylate (a) and the (meth)acrylic acid (b), and although derived from methyl (meth)acrylate (a) and (meth)acrylic acid (b), the unit (A) does not include the unit (C).

From the viewpoint of the shaped article of the present invention having excellent heat resistance, the lower limit value of the content ratio of the unit (C) in the copolymer (P2) is 0.01 mol % with respect to the total number of moles of repeating units contained in the copolymer (P2), more preferably 0.02 mol %, and even more preferably 0.03 mol %. From the viewpoint of the shaped article of the present invention having coloring by shaping and an excellent shaped appearance and weather resistance, the upper limit value of the content ratio of the unit (C) in the copolymer (P2) is 2 mol %, more preferably 1.2 mol %, and even more preferably 0.6 mol %. It is possible to arbitrarily combine the preferable upper limit value and the preferable lower limit value described above to form preferable combinations of the upper limit value and the lower limit value. For example, the content ratio of the unit (C) in the copolymer (P2) is 0.01 mol % or more and 2 mol % or less with respect to the total number of moles of repeating units contained in the copolymer (P2), 0.02 mol % or more and 1.2 mol % or less is preferable, and 0.03 mol % or more and 0.6 mol % or less is more preferable.

The copolymer (P2) may include the unit (D) described above in addition to the unit (A), the unit (B), and the unit (C).

Regarding the content ratio of the unit (D) in the copolymer (P2), the unit (D) is preferably not contained in the copolymer (P2) such that the inherent performance of the acrylic resin is not impaired in the shaped article. In addition, even in a case where the unit (D) is contained in the copolymer (P2), the content ratio of the unit (D) in the copolymer (P2) is preferably more than 0 mol % and 15 mol % or less with respect to the total number of moles of the repeating units contained in the copolymer (P2), and more preferably more than 0 mol % and 5 mol % or less.

In a case where the shaped article of the present invention includes 0.002% by mass or more and 0.03% by mass or less of the antioxidant (O) represented by General Formula (5) with respect to the total mass of the shaped article, the copolymer (P2) including 80 mol % or more of the unit (A), 2 mol % or more and 7 mol % or less of the unit (B), and 0.02 mol % or more and 1.2 mol % or less of the unit (C) is preferable from the viewpoint of suppressing the coloring by shaping of the shaped article and improving the shaped appearance and weather resistance.

In a case where the shaped article of the present invention includes 0.01% by mass or more and 0.025% by mass or less of the antioxidant (O) represented by General Formula (5) with respect to the total mass of the shaped article, the copolymer (P2) including 80 mol % or more of unit (A), 2 mol % or more and 3.5 mol % or less of unit (B), and 0.03 mol % or more and 0.6 mol % or less of unit (C) is preferable from the viewpoint of suppressing the coloring by shaping of the shaped article and improving the shaped appearance and weather resistance.

<Antioxidant (O)>

The antioxidant (O) is one of the constituent components of the thermoplastic resin composition of the present invention and the shaped article of the present invention.

The thermoplastic resin composition of the present invention including an antioxidant (O) represented by General Formula (1) improves the coloring by shaping, the shaped appearance, and the weather resistance of the shaped article obtained by shaping the thermoplastic resin composition of the present invention.

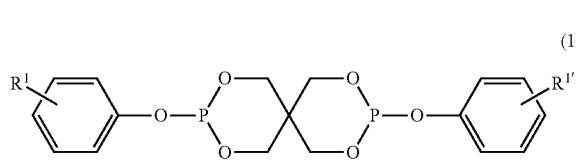
(1)

[in Formula (1), $R^1$ and $R^{1\prime}$ each independently represent one or a plurality of alkyl groups having 1 to 8 carbon atoms substituted at an arbitrary position on a phenyl group]

The antioxidant (O) is more preferably a compound having the structure of General Formula (2).

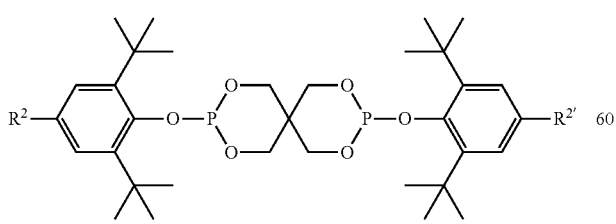
(2)

[in Formula (2), $R^2$ and $R^{2\prime}$ each independently represent an alkyl group having 1 to 8 carbon atoms]

By including the copolymer (P1) and the antioxidant (O) having the structure described above in the thermoplastic resin composition of the present invention, coloring during shaping of the thermoplastic resin composition is greatly suppressed and the shaped article obtained by shaping the thermoplastic resin composition has suppressed coloring and exhibits excellent transparency. In addition, by melt-kneading using the antioxidant (O), the content of unreacted methyl (meth)acrylate (a) and (meth)acrylic acid (b) contained in the obtained pellet-shaped thermoplastic resin composition (abbreviated below as "residual monomer") is reduced and appearance defects such as silver streaks are less likely to be generated in the shaped article obtained by shaping the thermoplastic resin composition of the present invention and it is possible to obtain a shaped article having a good appearance.

In addition, the shaped article of the present invention including the antioxidant (O) represented by General Formula (5) has suppressed coloring by shaping and an improved shaped appearance and weather resistance.

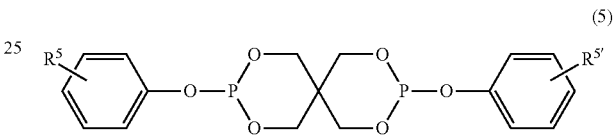
(5)

[in Formula (5), $R^5$ and $R^{5\prime}$ each independently represent one or a plurality of alkyl groups having 1 to 8 carbon atoms substituted at an arbitrary position on a phenyl group]

The antioxidant (O) is more preferably a compound having the structure of General Formula (6).

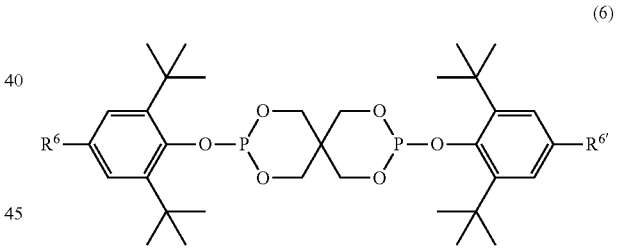
(6)

[in Formula (6), $R^6$ and $R^{6\prime}$ each independently represent an alkyl group having 1 to 8 carbon atoms]

<Phenolic Compound>

It is possible for the thermoplastic resin composition of the present invention to include a phenolic compound having the structure of General Formula (3) as a constituent component.

(3)

[in Formula (3), $R^3$ represents one or a plurality of alkyl groups having 1 to 8 carbon atoms substituted at an arbitrary position on a phenyl group]

The phenolic compound contained in the thermoplastic resin composition of the present invention includes a compound derived from the decomposition product of the antioxidant (O) blended in the copolymer (P1) precursor described above.

Here, "a compound derived from the decomposition product of the antioxidant (O) blended in the copolymer (P1) precursor described above" means a compound which is not derived from a compound contained as an additive such as stabilizer or the like in the monomer raw material in advance, but a compound produced by thermal decomposition of the antioxidant (O) blended in the copolymer (P1) precursor described above. More specifically, 90% by mass or more of the phenolic compound contained in the thermoplastic resin composition of the present invention is derived from the compound produced by the thermal decomposition of the antioxidant (O) blended in the copolymer (P1) precursor described above.

The thermoplastic resin composition of the present invention including the phenolic compound suppresses coloring by shaping of the shaped article obtained by shaping the thermoplastic resin composition of the present invention and improves the shaped appearance and weather resistance.

The phenolic compound contained in the thermoplastic resin composition of the present invention is more preferably a compound having the structure of General Formula (4).

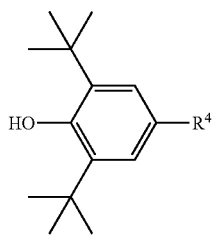

(4)

[in Formula (4), $R^4$ represents an alkyl group having 1 to 8 carbon atoms]

The content of the phenolic compound in the thermoplastic resin composition of the present invention is not particularly limited, and, from the viewpoint of suppressing coloring of a shaped article obtained by shaping the thermoplastic resin composition of the present invention and improving the shaped appearance and weather resistance, 0.001% by mass or more and 0.4% by mass or less is preferable, 0.005% by mass or more and 0.2% by mass or less is more preferable, and 0.008% by mass or more and 0.1% by mass or less is even more preferable.

It is possible to control the content of the phenolic compound in the thermoplastic resin composition of the present invention by adjusting the blending amount of the antioxidant (O), the temperature and time at the time of melt-kneading, or the like, in the method for producing a thermoplastic resin composition described below.

It is possible for the shaped article of the present invention to include a phenolic compound having the structure of General Formula (7) as a constituent component.

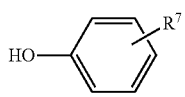

(7)

[in Formula (7), $R^7$ represents one or a plurality of alkyl groups having 1 to 8 carbon atoms substituted at an arbitrary position on a phenyl group]

The phenolic compound contained in the shaped article of the present invention includes a compound derived from a decomposition product of the antioxidant (O) blended in the copolymer (P1) precursor described above or a decomposition product of the antioxidant (O) contained in the thermoplastic resin composition of the present invention.

Here, "a compound derived from a decomposition product of the antioxidant (O) blended in the copolymer (P1) precursor described above or a decomposition product of the antioxidant (O) contained in the thermoplastic resin composition of the present invention" means a compound which is not derived from a compound contained as an additive such as a stabilizer in the monomer raw material in advance, but a compound produced by thermal decomposition of the antioxidant (O) blended in the copolymer (P1) precursor described above or the antioxidant (O) contained in the thermoplastic resin composition of the present invention. More specifically, 90% by mass or more of the phenolic compound contained in the shaped article of the present invention is derived from a compound produced by thermal decomposition of the antioxidant (O) blended with the copolymer (P1) precursor described above or the antioxidant (O) contained in the thermoplastic resin composition of the present invention.

The shaped article of the present invention including the phenolic compound suppresses coloring and improves the shaped appearance and weather resistance.

The phenolic compound contained in the shaped article of the present invention is more preferably a compound having the structure of General Formula (8).

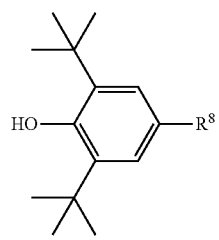

(8)

[in Formula (8), $R^8$ represents an alkyl group having 1 to 8 carbon atoms]

From the viewpoint of suppressing coloring by shaping of the shaped article of the present invention and improving the shaped appearance, the content of the phenolic compound in the shaped article of the present invention is preferably 0.001% by mass or more and 0.4% by mass or less, more preferably 0.005% by mass or more and 0.2% by mass or less, and even more preferably 0.01% by mass or more and 0.1% by mass or less.

<Method for Producing Thermoplastic Resin Composition>

It is possible to produce the thermoplastic resin composition of the present invention by methods shown in (1) and (2) below.

(1) A method for melt-mixing the copolymer (P1) precursor and the antioxidant (O) described above using a known melt-kneading means (the unit (C) is formed by the melt-mixing).

(2) A method for melt-mixing the copolymer (P1) and the antioxidant (O) using a known melt-kneading means (the unit (C) is further formed by melt-mixing.)

Details are as described in the method for producing the copolymer (P1) described above.

Examples of known melt-kneading means include apparatuses such as a uniaxial extruder, a diaxial extruder, a Banbury mixer, a Brabender, a roll mill, and the like. At the same time as the melt-kneading, shaping such as extrusion shaping or sheet shaping may be carried out as it is. Among these, from the viewpoint of excellent mixing efficiency, melt-kneading by a diaxial extruder is particularly preferable.

<Other Additives>

The thermoplastic resin composition of the present invention may include other additives in addition to the copolymer (P1) and the antioxidant (O).

Examples thereof other additives include UV absorbers, anti-aging agents, light stabilizers, plasticizers, light diffusing agents, matting agents, lubricants, mold release agents, antistatic agents, impact strength modifiers, fluidity modifiers, slidability imparting agents, colorants such as pigments and dyes, and the like. These other additives may be used as one type alone or two or more types thereof may be used in combination.

The other additives may be added when the copolymer (P1) precursor of the present invention and the antioxidant (O) are mixed or may be added to or mixed with the thermoplastic resin composition of the present invention.

Since the heat deflection temperature (HDT) of a shaped article obtained by shaping the thermoplastic resin composition of the present invention is 105° C. or higher, the heat resistance of the obtained shaped article is excellent. In this specification, the heat deflection temperature is a value measured according to the ISO 75-1.2 method.

The content of the residual monomer in the thermoplastic resin composition of the present invention is preferably 0.5% by mass or less with respect to the total mass of the thermoplastic resin composition.

If the amount of residual monomer is 0.5% by mass or less, when shaping the thermoplastic resin composition of the present invention, it is possible to suppress appearance defects such as silver streaks from occurring in the shaped article and the obtained shaped article is superior in thermal stability and weather resistance.

The upper limit value of the residual monomer content in the thermoplastic resin composition of the present invention is more preferably 0.4% by mass, even more preferably 0.3% by mass, and containing no residual monomer is particularly preferable. In the present specification, "residual monomer" refers to the unreacted methyl (meth)acrylate (a) and (meth)acrylic acid (b) contained in the thermoplastic resin composition. Furthermore, in a case where the copolymer (P1) includes the unit (D), the "residual monomer" further includes the unreacted other monomer (d) contained in the thermoplastic resin composition.

<Method for Producing Shaped Article>

The shaped article of the present invention is obtained by shaping the thermoplastic resin composition of the present invention.

The method for obtaining the shaped article of the present invention is not particularly limited and examples thereof include methods for shaping the thermoplastic resin composition of the present invention using a known shaping means such as an injection shaping method, an extrusion shaping method, or a pressure shaping method. In addition, the obtained shaped article may be further subjected to secondary shaping by a known shaping method such as a pressure forming method or a vacuum forming method.

It is possible to obtain the shaped article of the present invention by shaping the thermoplastic resin composition of the present invention. Accordingly, the obtained shaped article has a heat deflection temperature (HDT) of 105° C. or higher and in a case of measuring a flat shaped article having a thickness of 3 mm, it is possible to set the total light transmittance to 90% or more, the haze value to 1.0% or less, and the yellow index value to 0.6 or less. Therefore, the shaped article of the present invention is excellent in heat resistance, transparency, and coloring by shaping. In addition, the shaped appearance and weather resistance are excellent for the reasons described above.

EXAMPLES

A detailed description will be given of the present invention using Examples, but the present invention is not limited to these Examples.

<Evaluation Method>

The evaluation in the Examples and Comparative Examples was carried out by the following method.

<Preparation of Shaped Article>

(1) Preparation of Shaped Article (A)

Using an injection molding machine (model name: EC20PNII, manufactured by Toshiba Machine Co., Ltd.), thermoplastic resin compositions obtained in the Examples and Comparative Examples were injection molded under conditions of a molding temperature of 250° C., a mold temperature of 76° C., and a molding time of 360 seconds, and a shaped article (A) (length 50 mm, width 50 mm, and thickness 3 mm) was obtained.

(2) Preparation of Shaped Article (B)

Using the injection molding machine (model name: PS60E, manufactured by Nissei Plastic Industrial Co., Ltd.), the thermoplastic resin compositions obtained in the Examples and Comparative Examples were injection molded under conditions of a molding temperature of 250° C., a mold temperature of 76° C., and a molding time of 360 seconds, and a shaped article (B) (ISO dumbbell specimen A type (ISO3167) ISO multi-purpose specimen) was obtained.

<Transparency: Total Light Transmittance and Haze>

As an index of the transparency of the thermoplastic resin composition, the total light transmittance of the shaped article (A) was measured according to ISO13468 using a haze meter (model name: NDH4000, manufactured by Nippon Denshoku Industries Co., Ltd.). In addition, the haze of the shaped article (A) was measured according to ISO14782.

<Transparency: Yellow Index (YI)>

As an index for coloring by shaping of the thermoplastic resin composition, the yellow index (YI) of the shaped article (A) according to ISO 17223 was measured using a spectroscopic color difference meter (model name: SE-7700, manufactured by Nippon Denshoku Industries Co., Ltd.) and three-level evaluation was performed according to the following criteria.

AA: YI is less than 0.6
A: YI is 0.6 or more and less than 0.7
B: YI is 0.7 or more <Heat Resistance: Heat Deflection Temperature (HDT)>

The heat deflection temperature (HDT) was measured as an index of the heat resistance of the thermoplastic resin composition. The shaped article (B) was cut into a length of 80 mm×width of 10 mm (thickness of 4 mm) then annealed at 91° C. for 16 hours, and the shaped article (B) after annealing was used as a test piece for heat resistance evaluation.

Using an HDT/VICAT testing machine (model name: No. 148-HD-PC3, Heat Distortion Tester, manufactured by Yasuda Seiki Seisakusho Co., Ltd.), the heat deflection temperature (HDT, unit: ° C.) of the test piece was measured according to ISO 75-1.2 under conditions of a load of 1.8 MPa, and two-level evaluation was performed according to the following criteria.

A: HDT is 106° C. or higher
B: HDT is less than 106° C.

<Appearance of Shaped Article>

Using an injection molding machine (model name: EC20PN2, manufactured by Toshiba Machine Co., Ltd.), the thermoplastic resin compositions obtained in Examples and Comparative Examples were injection molded under the conditions of a molding temperature of 280° C. and a molding time of 360 seconds, and a shaped article having a length of 50 mm, a width of 50 mm, and a thickness of 3 mm was obtained. The appearance of 10 obtained shaped articles was visually observed and three-level evaluation was performed according to the following criteria.

AA: In all the shaped articles, no silver streaks were observed
A: Silver streaks were observed in 1 to 5 shaped articles
B: Silver streaks were observed in 6 to 10 shaped articles <Content Ratio of Units (A), (B), and (C)>

The content ratio of units (A), (B), and (C) contained in the copolymer (P1) contained in the thermoplastic resin composition or the copolymer (P2) contained in the shaped article (below abbreviated together as "copolymer (P)") was measured according to the following procedure.

2.5 g of the thermoplastic resin compositions or shaped articles obtained in the Examples and Comparative Examples were dissolved in 20 mL of acetone and then dropped into 90 mL of methanol to obtain a precipitate. Next, the filtrate was removed using filter paper to obtain a precipitate (1). Next, approximately 2.1 g of the obtained precipitate (1) was dissolved in 20 mL of acetone and then dropped into 90 mL of methanol to obtain a precipitate (2). The obtained precipitate (2) was dried overnight at 40° C. using a vacuum dryer to obtain the copolymer (P).

50 mg of the copolymer (P) and 2 ml of dimethyl sulfoxide (DMSO-d) were supplied to a 20 ml Schlenk tube provided with a stirrer and heated to 80° C. while stirring to dissolve the copolymer (P). Thereafter, the result was cooled to 23° C., 50 mg (51.0 μl) of benzylamine was added to the Schlenk tube and heated to 80° C. while stirring and the result was held for 1 hour to obtain a polymer solution.

By the benzylamine process described above, the unit (C) in the copolymer (P) is ring-opened by a reaction with benzylamine, and a (meth)acrylic acid benzylamide structural unit and a repeating unit derived from (meth)acrylic acid are newly formed. The repeating unit derived from the (meth)acrylic acid has the same structure as the unit (B). Accordingly, based on the measured content value of the (meth)acrylic acid benzylamide structure, the content ratio of the unit (C) in the copolymer (P) was calculated. Furthermore, based on a value obtained by subtracting the content of the unit (C) from the measured content value of the unit (B), the content ratio of the unit (B) in the copolymer (P) was calculated. In addition, based on the measured content value of the unit (A), the content ratio of the unit (A) in a copolymer (P) was calculated.

The polymer solution in the Schlenk tube described above was cooled to room temperature, then, using a nuclear magnetic resonance spectrum measuring device (manufactured by Varian, resonance frequency: 270 MHz), $^1$H-NMR measurement was performed under the conditions of a measurement temperature of 80° C. and an accumulation count of 128 times.

From the obtained $^1$H-NMR measurement result, from an integral value ($I_1$) of the singlet peak of the benzyl proton of unreacted benzylamine present in the vicinity of 3.7 ppm and an integral value ($I_2$) of the singlet peak of the benzyl proton derived from the (meth)acrylic acid benzylamide structure derived from the unit (C) present in the vicinity of 4.2 ppm, a ratio Rc of the amount of benzyl protons of the unreacted benzylamine with respect to the content of the unit (C) in the copolymer (P) was calculated using Formula (I).

$$Rc = I_2/(I_1 \times 2) \tag{I}$$

From an integral value ($I_3$) of the protons of the singlet peak derived from the methyl methacrylate (MMA) unit and methyl acrylate (MA) unit derived from the unit (A) present in the vicinity of 3.5 ppm and the integrated value ($I_1$), a ratio Ra of the amount of benzyl protons of the unreacted benzylamine with respect to the content of the unit (A) in the copolymer (P) was calculated using formula (II).

$$Ra = I_3/(I_1 \times 3) \tag{II}$$

From an integral value ($I_4$) of protons of the singlet peak of a methyl methacrylate (MMA) unit and a methyl acrylate (MA) unit derived from the unit (A) present in the vicinity of 0.5 ppm or more and 2.5 ppm or less and a methacrylic acid (MAA) unit derived from the units (B) and the integral value ($I_1$), the ratio Rb of the amount of benzyl protons of the unreacted benzylamine with respect to the content of the unit (B) in the copolymer (P) was calculated using formula (III).

$$Rb = [I_4/(I_1 \times 5)] - (Rc + Ra) \tag{III}$$

From the obtained values of Ra, Rb, and Rc, using Formulas (IV) to (IX), the content ratios (unit: mol %) of the unit (A), the unit (B), and the unit (C) in the copolymer (P) were calculated.

[Formula 1]

$$Ca = \frac{Ra}{(Ra + Rb + Rc)} \tag{IV}$$

$$Cc = \frac{Rc}{(Ra + Rb + Rc)} \tag{V}$$

$$Cb = \frac{Rb - Rc}{(Ra + Rb + Rc)} \tag{VI}$$

$$\text{Content of unit }(A) = \frac{Ca \times 100}{(Ca + Cb + Cc)} \tag{VII}$$

$$\text{Content of unit }(B) = \frac{Cb \times 100}{(Ca + Cb + Cc)} \tag{VIII}$$

$$\text{Content of unit }(C) = \frac{Cc \times 100}{(Ca + Cb + Cc)} \tag{IX}$$

<Quantification of Residual Monomer>

Residual monomers in the thermoplastic resin compositions obtained in Examples and Comparative Examples were measured using gas chromatography/mass spectrometry (GC/MS). Here, "residual monomer" refers to the total amount of unreacted methyl (meth)acrylate (a) and (meth) acrylic acid (b) contained in the thermoplastic resin composition. Furthermore, in a case where the copolymer (P) includes the unit (D), the "residual monomer" further includes the unreacted other monomer (d) contained in the thermoplastic resin composition.

After 0.6 g of pellets of the thermoplastic resin composition were dissolved in acetone for residual agricultural chemical testing, 0.2 mL of 2% (v/v) methyl salicylate (residual agricultural chemical acetone solution) was added as an internal standard, and the result was a sample for GC/MS measurement.

GC/MS measurement was performed under the following conditions, the residual monomer content ratio in the thermoplastic resin composition was quantified by an internal standard method, and the sum of each of the obtained residual monomer content ratios was set as the residual monomer amount.

(Measurement Conditions of Gas Chromatograph Mass Spectrometer)
Gas chromatograph measuring device: HP6890 (manufactured by Agilent Technologies)
Mass spectrometer (MS): HP5973 (manufactured by Agilent Technologies)
Ionization method: EI
Column: DB-WAX (manufactured by Agilent Technologies, column size: 60 m×250 μm×0.50 μm)
Temperature raising conditions: after holding at 70° C. for 5 minutes, the temperature was raised to 200° C. at a heating rate of 10° C./min, and further held at 200° C. for 5 minutes.
Injection port temperature: 220° C.
Ion source temperature: 230° C.
Split ratio: 10:1
Carrier gas: Helium (flow rate 2.0 mL/min)
The relationship between the measurement time in SIM mode and selected ions is as shown in the table below.

TABLE 1

|  | Measuring time range (min) | Selected ions |
| --- | --- | --- |
| Methanol | 4.30-5.30 | 31 |
| Methyl acrylate | 5.30-6.50 | 55 |
| Methyl methacrylate | 6.50-15.0 | 69 |
| Methacrylic acid | 15.0-19.0 | 86 |
| Methyl salicylate (internal standard) | 19.0- | 152 |

<Quantification of Residual Antioxidant (O)>
The content ratio of the antioxidant (O) contained in the thermoplastic resin composition or the shaped article was measured by the following method using high-performance liquid chromatography.

2.5 g of the thermoplastic resin compositions or shaped articles obtained in the Examples and Comparative Examples were dissolved in 20 mL of acetone and then dropped into 90 mL of methanol to obtain a precipitate. Next, after removing the precipitate using a filter paper, acetone and methanol were removed from the recovered filtrate using an evaporator to obtain a dried product. Next, 5 mL of chloroform and 5 mL of acetonitrile were added to the dried product and a 2% (v/v) trioctyl trimellitic acid/acetonitrile solution was added as an internal standard solution, and the result was used as a sample for high-performance liquid chromatography measurement. The measurement conditions of the high-performance liquid chromatography are as follows.

(Measurement Conditions for High-Performance Liquid Chromatography)
Device: Agilent 1260 infinity (manufactured by Agilent Technologies)
Column: CAPCELL PAK $C_{18}$ UG120 (manufactured by Shiseido Co., Ltd., column size: 3.0ϕ×250 mm (5 microns)/Col)
Eluent: A=acetonitrile, B=ion exchange water
Measurement conditions: Eluent A/B=60/40 was changed to A/B=100/0 over 15 minutes and then held for 15 minutes.
Flow rate: 1.0 mL/min
Injection amount: 5 μL
Detector: PDA (measurement wavelength=210, 230, 250, 280 nm)
Measurement temperature: 40° C.

The holding time under the measurement conditions described above is 8.79 minutes for dibutylhydroxytoluene (phenolic compound), 18.53 minutes for Adekastab (registered trademark) PEP-36, 19.75 minutes for Adekastab (registered trademark) HP-10, 26.09 minutes for Adekastab (registered trademark) 2112, 18.28 minutes for Adekastab (registered trademark) AO-60, and 19.73 minutes for trioctyl trimellitic acid (internal standard).

In addition, since it was not possible to detect antioxidant (2) under the measurement conditions described above, measurement was carried out under the conditions described below using the gas chromatograph measuring device with an FID detector.

(GC (FID) Measurement Conditions)
Device: 7890B (manufactured by Agilent Technologies)
Column: Zebron ZB-1HT (manufactured by Shimadzu GLC Ltd., column size: 15 m×250 μm×0.1 μm)
Temperature raising condition: after holding at 150° C. for 2 minutes, the temperature was raised to 350° C. at a heating rate of 20° C./min, and further held at 350° C. for 7 minutes.
Injection port temperature: 350° C.
Detector temperature: 400° C.
Split ratio: 20:1
Carrier gas: Helium (flow rate 3.8 mL/min)
Injection amount: 1 μL
The holding time of the Adekastab (registered trademark) PEP-8 under the above measurement conditions was 3.60 minutes.

<Weather Resistance (ΔYI)>
As a weather resistance index of the thermoplastic resin composition, the amount of change in the yellow index (ΔYI) was measured by the following method.

The thermoplastic resin compositions obtained in the Examples and Comparative Examples were injection molded using an injection molding machine (model name: EC20PN2, manufactured by Toshiba Machine Co., Ltd.) under conditions of a molding temperature of 280° C. and a molding time of 360 seconds, and a shaped article having a length of 50 mm, a width of 50 mm, and a thickness of 3 mm was obtained. Subsequently, using a spectroscopic color difference meter (model name: SE-7700, manufactured by Nippon Denshoku Industries Co., Ltd.), the yellow index ($YI_1$) of the shaped article immediately after shaping was measured in accordance with ISO17223. Subsequently, the yellow index ($YI_2$) was measured after the shaped article after measurement was heated at 110° C. for 1000 hours in an air atmosphere in a dryer (model name: VO-320, manufactured by Advantec). The difference between $YI_2$ and $YI_1$ ($\Delta YI = YI_2 - YI_1$) was calculated and this was used as an index of the weather resistance of the thermoplastic resin composition and three-level evaluation was performed according to the following criteria.

AA: ΔYI is less than 2.6
A: ΔYI is 2.6 or more and less than 3.6
B: ΔYI is 3.6 or more (Raw Materials)

The abbreviations of the compounds used in Examples and Comparative Examples are as follows.

MMA: Methyl methacrylate (trade name: Acryester (registered trademark) M, manufactured by Mitsubishi Chemical Corporation)

MA: Methyl acrylate (manufactured by Mitsubishi Chemical Corporation)

MAA: Methacrylic acid

Polymerization initiator (1): 2,2'-azobis(2-methylpropionamidine) dihydrochloride Polymerization initiator (2): 2,2'-azobis-2-methylbutyronitrile (trade name: V-59, manufactured by Wako Pure Chemical Industries, Ltd.)

Chain transfer agent (1): n-octyl mercaptan (manufactured by Tokyo Chemical Industry Co., Ltd.)

Antioxidant (1): Bis(2,6-di-t-butyl-4-methylphenyl) pentaerythritol diphosphite (trade name: Adekastab (registered trademark) PEP-36, manufactured by Adeka)

Antioxidant (2): Bisstearyl pentaerythritol diphosphite (trade name: Adekastab (registered trademark) PEP-8, manufactured by Adeka)

Antioxidant (3): 2,2'-methylenebis(4,6-di-t-butyl-1-phenyloxy) (2-ethylhexyloxy) phosphorus (trade name: Adekastab (registered trademark) HP-10, manufactured by Adeka)

Antioxidant (4): Tris(2,4-di-t-butylphenyl)phosphite (trade name: Adekastab (registered trademark) 2112, manufactured by Adeka)

Antioxidant (5): Tetrakis[methylene-3-(3',5'-di-t-butyl-4-hydroxyphenyl)propionate] methane (trade name: Adekastab (registered trademark) AO-60, manufactured by Adeka)

Copolymer precursor (1): Copolymer produced in [Production Example 2] (precursor of copolymer (1))

Copolymer precursor (2): Copolymer produced in [Production Example 3] (precursor of copolymer (2))

Copolymer precursor (3): Copolymer produced in [Production Example 4] (precursor of copolymer (3))

Production Example 1

After adding 900 parts by mass of deionized water, 60 parts by mass of sodium 2-sulfoethyl methacrylate, 10 parts by mass of potassium methacrylate, and 12 parts by mass of MMA to a reaction container provided with a reflux condenser under a nitrogen atmosphere, the liquid temperature in the reaction container was raised to 50° C. while stirring. Thereafter, 0.08 parts by mass of a polymerization initiator (1) were added thereto and the liquid temperature in the reaction container was raised to 60° C. while stirring, then MMA was continuously added dropwise at 0.24 parts by mass/min using a dropping pump over 75 minutes. Thereafter, the result was held for a further six hours to perform polymerization and obtain a dispersant (solid content: 10% by mass).

Production Example 2

After adding 2000 parts by mass of deionized water and 4.2 parts by mass of sodium sulfate to a reaction container with a reflux condenser provided with a nitrogen gas inlet tube, the mixture was stirred for 15 minutes at a stirring speed of 320 rpm. Thereafter, a mixed solution of 1351.6 parts by mass of MMA, 36.3 parts by mass of MAA, 12.1 parts by mass of MA, 2.8 parts by mass of polymerization initiator (2), and 4.2 parts by mass of chain transfer agent (1) was added to the reaction container and stirred for 5 minutes. Next, 6.72 parts by mass of the dispersant (solid content: 10% by mass) manufactured in Production Example 1 were added to the reaction container, then stirred to disperse the monomer composition in the reaction container in water. Thereafter, the inside of the reaction container was substituted with nitrogen.

Subsequently, the liquid temperature in the reaction container was raised to 75° C., then the liquid temperature in the reaction container was continuously measured and held at 75° C. until a polymerization exothermic peak was observed. After the polymerization exothermic peak was observed, the temperature was raised such that the liquid temperature in the reaction container was 90° C., and the polymerization was carried out by holding for 60 minutes. Thereafter, the mixture in the reaction container was filtered and the filtrate was washed with deionized water and dried at 80° C. for 16 hours to obtain a bead-shaped copolymer, and this was a precursor of the copolymer (1) (Copolymer precursor (1)).

The composition of the copolymer precursor (1) was 96.0 mol % MMA units, 3.0 mol % MAA units, and 1.0 mol % MA units.

Production Example 3

Except for using a mixed solution of 1327.0 parts by mass of MMA, 60.8 parts by mass of MAA, 12.2 parts by mass of MA, 2.8 parts by mass of polymerization initiator (2), and 4.2 parts by mass of chain transfer agent (1), polymerization was performed under the same conditions as in Production Example 2 to obtain a bead-shaped copolymer, and this was a precursor of copolymer (2) (copolymer precursor (2)).

The composition of the copolymer precursor (2) was 94.0 mol % MMA units, 5.0 mol % MAA units, and 1.0 mol % MA units.

Production Example 4

Except for using a mixed solution of 1388.0 parts by mass of MMA, 12.0 parts by mass of MA, 2.8 parts by mass of polymerization initiator (2), and 4.2 parts by mass of chain transfer agent (1), polymerization was performed under the same conditions as in Production Example 2 to obtain a bead-shaped copolymer (3), and this was a precursor of copolymer (3) (copolymer precursor (3)).

The composition of the copolymer precursor (3) was 99.0 mol % MMA units and 1.0 mol % MA units.

Example 1

100 parts by mass of copolymer precursor (1) and 1.0 part by mass of antioxidant (1) as the antioxidant (O) were supplied to a diaxial extruder (model name "PCM30", manufactured by Ikegai Corp.) and kneaded at 250° C. to obtain a pellet-shaped thermoplastic resin composition.

The composition of the copolymer (1) in the obtained thermoplastic resin composition was 97 mol % of repeating units derived from methyl (meth)acrylate (a), 2.99 mol % of repeating units derived from (meth)acrylic acid (b), and 0.01 mol % of repeating units having a glutaric anhydride structure.

Table 2 and table 3 show the evaluation results for the obtained thermoplastic resin composition and the shaped article.

Examples 2 and 3

Pellet-shaped thermoplastic resin compositions were obtained by performing the same operations as in Example 1, except that, in the producing of the thermoplastic resin compositions, the blending amounts of the antioxidant (O) were as shown in Table 2.

Table 2 and table 3 show the evaluation results of the obtained thermoplastic resin compositions and the shaped articles.

Comparative Example 1

A pellet-shaped thermoplastic resin composition was obtained by performing the same operations as in Example 1, except that, in the producing of the thermoplastic resin composition, the copolymer precursor (1) was changed to the copolymer precursor (3) and the blending amount of the antioxidant (O) was as shown in Table 2.

Table 2 and table 3 show the evaluation results of the obtained thermoplastic resin composition and the shaped article.

Comparative Example 2

A pellet-shaped thermoplastic resin composition was obtained by performing the same operations as in Example 1 except that, in the producing of the thermoplastic resin composition, the antioxidant (O) was not used.

Table 2 and table 3 show the evaluation results of the obtained thermoplastic resin composition and the shaped article.

Comparative Examples 3 to 6

Pellet-shaped thermoplastic resin compositions were obtained by performing the same operations as in Example 1 except that, in the producing of the thermoplastic resin compositions, the types and blending amounts of the antioxidant (O) were changed as shown in Table 2.

Table 2 and table 3 show the evaluation results of the obtained thermoplastic resin composition and the shaped article.

Examples 4 and 5

Pellet-shaped thermoplastic resin compositions were obtained by performing the same operations as in Example 1 except that, in the producing of the thermoplastic resin compositions, the copolymer precursor (1) was changed to the copolymer precursor (2) and the blending amounts of the antioxidant (O) were changed as shown in Table 2.

Table 2 and table 3 show the evaluation results of the obtained thermoplastic resin compositions and the shaped articles.

Example 6

A pellet-shaped thermoplastic resin composition was obtained by performing the same operations as in Example 2 except that, in the producing of the thermoplastic resin composition, the kneading temperature of the diaxial extruder was changed to 260° C.

Table 2 and table 3 show the evaluation results of the obtained thermoplastic resin composition and the shaped article.

TABLE 2

| | Blending conditions | | | | Thermoplastic resin composition | | | | | |
| --- | --- | --- | --- | --- | --- | --- | --- | --- | --- | --- |
| | Copolymer precursor | | Antioxidant | | | | | Copolymer | | |
| | Type | Parts by mass | Type | Parts by mass | Residual monomer % by mass | Antioxidant % by mass | Phenolic compound % by mass | Unit (A) mol % | Unit (B) mol % | Unit (C) mol % |
| Example 1 | Copolymer precursor (1) | 100 | Antioxidant (1) | 1.00 | 0.12 | 0.17 | 0.34 | 97.0 | 2.99 | 0.01 |
| Example 2 | Copolymer precursor (1) | 100 | Antioxidant (1) | 0.25 | 0.22 | 0.11 | 0.02 | 97.0 | 2.99 | 0.01 |
| Example 3 | Copolymer precursor (1) | 100 | Antioxidant (1) | 0.10 | 0.23 | 0.04 | 0.01 | 97.0 | 2.99 | 0.01 |
| Comparative Example 1 | Copolymer precursor (3) | 100 | Antioxidant (1) | 0.25 | 0.41 | 0.19 | 0.01 | 100.0 | N.D. | N.D. |
| Comparative Example 2 | Copolymer precursor (1) | 100 | — | — | 0.37 | — | — | 97.0 | 2.99 | 0.01 |
| Comparative Example 3 | Copolymer precursor (1) | 100 | Antioxidant (2) | 0.25 | 0.27 | 0.22 | N.D. | 97.0 | 2.99 | 0.01 |
| Comparative Example 4 | Copolymer precursor (1) | 100 | Antioxidant (3) | 0.25 | 0.37 | 0.18 | N.D. | 97.0 | 2.99 | 0.01 |
| Comparative Example 5 | Copolymer precursor (1) | 100 | Antioxidant (4) | 0.25 | 0.38 | 0.21 | N.D. | 97.0 | 2.99 | 0.01 |
| Comparative Example 6 | Copolymer precursor (1) | 100 | Antioxidant (5) | 0.25 | 0.34 | 0.26 | N.D. | 97.0 | 2.99 | 0.01 |
| Example 4 | Copolymer precursor (2) | 100 | Antioxidant (1) | 0.20 | 0.30 | 0.08 | 0.03 | 95.0 | 4.99 | 0.01 |
| Example 5 | Copolymer precursor (2) | 100 | Antioxidant (1) | 1.00 | 0.12 | 0.17 | 0.34 | 95.0 | 4.90 | 0.10 |
| Example 6 | Copolymer precursor (1) | 100 | Antioxidant (1) | 0.25 | 0.21 | 0.13 | 0.04 | 97.0 | 2.99 | 0.01 |

TABLE 2-continued

|  | | Shaped article | | | | |
|---|---|---|---|---|---|---|
|  | | | | Copolymer | | |
|  | | Antioxidant % by mass | Phenolic compound % by mass | Unit (A) mol % | Unit (B) mol % | Unit (C) mol % |
|  | Example 1 | 0.003 | 0.56 | 96.8 | 2.70 | 0.50 |
|  | Example 2 | 0.016 | 0.09 | 96.9 | 2.90 | 0.20 |
|  | Example 3 | 0.017 | 0.02 | 97.0 | 2.90 | 0.10 |
|  | Comparative Example 1 | N.D. | 0.12 | 100.0 | N.D. | N.D. |
|  | Comparative Example 2 | — | — | 96.9 | 2.90 | 0.20 |
|  | Comparative Example 3 | 0.200 | N.D. | 96.8 | 2.80 | 0.40 |
|  | Comparative Example 4 | 0.130 | N.D. | 96.9 | 2.80 | 0.30 |
|  | Comparative Example 5 | 0.180 | N.D. | 96.9 | 2.80 | 0.30 |
|  | Comparative Example 6 | 0.240 | N.D. | 96.9 | 2.80 | 0.30 |
|  | Example 4 | 0.005 | 0.09 | 94.5 | 4.70 | 0.80 |
|  | Example 5 | 0.002 | 0.56 | 94.3 | 4.20 | 1.50 |
|  | Example 6 | 0.007 | 0.11 | 97.0 | 2.90 | 0.10 |

TABLE 3

| | Evaluation results of shaped article | | | | | | | |
|---|---|---|---|---|---|---|---|---|
| | Heat resistance | | Transparency | | | | | |
| | Heat deflection temperature (HDT) | | Total light transmittance | Haze | Coloring by shaping YI | | Shaped appearance | Weather resistance ΔYI | |
| | ° C. | Evaluation | % | % | — | Evaluation | | — | Evaluation |
| Example 1 | 109 | A | 92.3 | 0.27 | 0.50 | AA | AA | 3.5 | A |
| Example 2 | 110 | A | 92.4 | 0.24 | 0.50 | AA | AA | 2.0 | AA |
| Example 3 | 109 | A | 92.4 | 0.18 | 0.50 | AA | AA | 1.2 | AA |
| Comparative Example 1 | 103 | B | 92.1 | 0.55 | 0.70 | B | AA | 1.0 | AA |
| Comparative Example 2 | 109 | A | 92.3 | 0.30 | 0.70 | B | B | 1.6 | AA |
| Comparative Example 3 | 109 | A | 92.4 | 0.22 | 0.40 | AA | B | 3.5 | A |
| Comparative Example 4 | 109 | A | 92.4 | 0.18 | 0.50 | AA | B | 3.5 | A |
| Comparative Example 5 | 108 | A | 92.4 | 0.13 | 0.50 | AA | B | 3.2 | A |
| Comparative Example 6 | 108 | A | 92.3 | 0.16 | 0.80 | B | AA | 4.0 | B |
| Example 4 | 110 | A | 92.5 | 0.26 | 0.43 | AA | AA | 2.5 | AA |
| Example 5 | 110 | A | 92.4 | 0.58 | 0.60 | A | A | 3.5 | A |
| Example 6 | 108 | A | 92.5 | 0.27 | 0.42 | AA | AA | 2.5 | AA |

Since the thermoplastic resin compositions obtained in Examples 1 to 6 blended the copolymer (P1) and the antioxidant (O), the obtained shaped articles had an excellent balance between the heat resistance, transparency, appearance after shaping, and weather resistance and coloring during shaping processing was suppressed.

On the other hand, in the thermoplastic resin composition obtained in Comparative Example 1, since the copolymer did not include the unit (B) and the unit (C) but only contained the unit (A), the heat resistance of the obtained shaped article was insufficient.

Since the thermoplastic resin composition obtained in Comparative Example 2 did not include the antioxidant (O), the obtained shaped article was colored yellow and the transparency was insufficient.

Since the thermoplastic resin compositions obtained in Comparative Examples 3 to 5 did not include the antioxidant (O) represented by Formula (1), silver streaks were easily generated during shaping and the appearance of the obtained shaped articles was insufficient.

Since the thermoplastic resin composition obtained in Comparative Example 6 did not include the antioxidant (O) represented by Formula (1) and did include an antioxidant which did not contain phosphorus, the obtained shaped article was colored yellow and the transparency was insufficient.

INDUSTRIAL APPLICABILITY

That is, the object of the present invention is to provide a thermoplastic resin composition excellent in heat resistance, transparency, appearance after shaping, and weather resistance, and in which coloring is suppressed during shaping processing, a shaped article including the thermoplastic resin composition, and a vehicle component including the shaped article.

Since the shaped article of the present invention is excellent in heat resistance, transparency, appearance after shaping, and weather resistance, and coloring is suppressed, it is possible to use the shaped article for optical materials, vehicle components, lighting materials, building materials, and the like, in particular, the shaped article is suitable for automotive vehicle components.

Examples of automotive vehicle components include a rear lamp outer cover, an optical member inside the rear lamp, an inner lens for a headlight (may be referred to as a projector lens or a PES lens), a meter cover, a door mirror housing, a pillar cover (sash cover), license garnish, front grille, fog garnish, emblems, and the like.

The invention claimed is:

1. A thermoplastic resin composition comprising:
    a copolymer (P1); and
    an antioxidant (O) represented by General Formula (2):

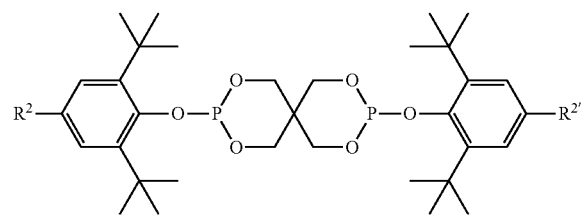

(2)

where $R^2$ and $R^{2'}$ each independently represent an alkyl group having 1 to 8 carbon atoms, where in the thermoplastic resin composition contain 80% by mass or more of the copolymer (P1) with respect to a total mass of the thermoplastic resin composition, and the copolymer (P1) includes 80 mol % or more of a repeating unit (A) derived from methyl (meth)acrylate (a), 2 mol % or more and 7 mol % or less of a repeating unit (B) derived from (meth)acrylic acid (b), and 0.001 mol % or more and 0.15 mol % or less of a repeating unit (C) having a glutaric anhydride structure.

2. The thermoplastic resin composition according to claim 1,
    wherein the thermoplastic resin composition contains 0.01% by mass or more and 0.18% by mass or less of the antioxidant (O) represented by the General Formula (2) with respect to the total mass of the thermoplastic resin composition.

3. The thermoplastic resin composition according to claim 1,
    wherein the thermoplastic resin composition contains 0.001% by mass or more and 0.4% by mass or less of a phenolic compound represented by General Formula (4) with respect to the total mass of the thermoplastic resin composition:

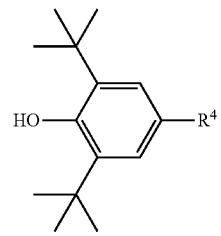

(4)

wherein $R^4$ represents an alkyl group having 1 to 8 carbon atoms.

4. The thermoplastic resin composition according to claim 1,
    wherein the thermoplastic resin composition contains 0.02% by mass or more and 0.14% by mass or less of the antioxidant (O) represented by the General Formula (2) with respect to the total mass of the thermoplastic resin composition, and
    the copolymer (P1) includes 80 mol % or more of a repeating unit (A) derived from methyl (meth)acrylate (a), 2 mol % or more and 7 mol % or less of a repeating unit (B) derived from (meth)acrylic acid (b), and 0.005 mol % or more and 0.02 mol % or less of a repeating unit (C) having a glutaric anhydride structure.

5. The thermoplastic resin composition according to claim 1,
    wherein the thermoplastic resin composition contains 0.03% by mass or more and 0.1% by mass or less of the antioxidant (O) represented by the General Formula (2) with respect to the total mass of the thermoplastic resin composition, and
    the copolymer (P1) includes 80 mol % or more of a repeating unit (A) derived from methyl (meth)acrylate (a), 2 mol % or more and 4 mol % or less of a repeating unit (B) derived from (meth)acrylic acid (b), and 0.0075 mol % or more and 0.015 mol % or less of a repeating unit (C) having a glutaric anhydride structure.

6. The thermoplastic resin composition according to claim 1,
    wherein a total content of unreacted methyl (meth)acrylate (a) and unreacted (meth)acrylic acid (b) contained in the thermoplastic resin composition is 0.5% by mass or less with respect to the total mass of the thermoplastic resin composition.

7. A shaped article comprising:
    the thermoplastic resin composition according to claim 1.

8. A shaped article comprising:
    a copolymer (P2); and
    an antioxidant (O) represented by General Formula (6):

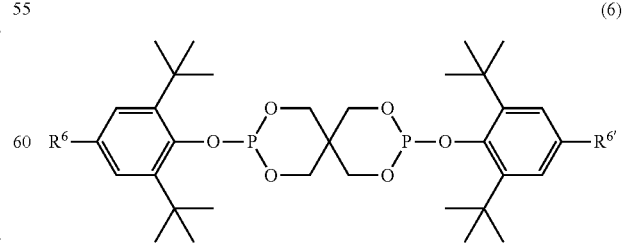

(6)

wherein $R^6$ and $R^{6'}$ each independently represent an alkyl group having 1 to 8 carbon atoms, wherein the shaped article contains 80% by mass or more of the copolymer (P2) with respect to a total mass of the shaped article, and the copolymer (P2) includes 80 mol % or more of a repeating unit (A) derived from methyl (meth)acrylate (a), 2 mol % or more and 7 mol % or less of a repeating unit (B) derived from (meth)acrylic acid (b), and 0.01 mol % or more and 2 mol % or less of a repeating unit (C) having a glutaric anhydride structure.

9. The shaped article according to claim 8, wherein the shaped article contains 0.001% by mass or more and 0.12% by mass or less of the antioxidant (O) represented by the General Formula (6) with respect to the total mass of the shaped article.

10. The shaped article according to claim 8, wherein the shaped article contains 0.001% by mass or more and 10% by mass or less of a phenolic compound represented by General Formula (8) with respect to the total mass of the shaped article:

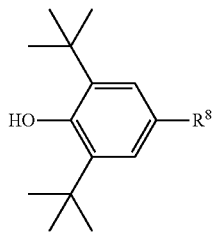

(8)

wherein $R^8$ represents an alkyl group having 1 to 8 carbon atoms.

11. The shaped article according to claim 8, wherein the shaped article contains 0.002% by mass or more and 0.03% by mass or less of the antioxidant (O) represented by General Formula (6) with respect to the total mass of the shaped article, and the copolymer (P2) includes 80 mol % or more of a repeating unit (A) derived from methyl (meth)acrylate (a), 2 mol % or more and 7 mol % or less of a repeating unit (B) derived from (meth)acrylic acid (b), and 0.02 mol % or more and 1.2 mol % or less of a repeating unit (C) having a glutaric anhydride structure.

12. The shaped article according to claim 8, wherein the shaped article contains 0.01% by mass or more and 0.025% by mass or less of the antioxidant (O) represented by General Formula (6) with respect to the total mass of the shaped article, and the copolymer (P2) includes 80 mol % or more of a repeating unit (A) derived from methyl (meth)acrylate (a), 2 mol % or more and 3.5 mol % or less of a repeating unit (B) derived from (meth)acrylic acid (b), and 0.03 mol % or more and 0.6 mol % or less of a repeating unit (C) having a glutaric anhydride structure.

13. A vehicle component comprising:

the shaped article according to claim 7.

* * * * *